(12) United States Patent
Oi

(10) Patent No.: US 6,962,444 B2
(45) Date of Patent: Nov. 8, 2005

(54) BEARING FOR FUEL PUMP, METHOD OF MANUFACTURING THE SAME, AND FUEL PUMP

(75) Inventor: Kiyotoshi Oi, Anjo (JP)

(73) Assignee: Denso Corporation, Kariya (JP)

( * ) Notice: Subject to any disclaimer, the term of this patent is extended or adjusted under 35 U.S.C. 154(b) by 207 days.

(21) Appl. No.: 10/394,171

(22) Filed: Mar. 24, 2003

(65) Prior Publication Data

US 2003/0185694 A1 Oct. 2, 2003

(30) Foreign Application Priority Data

Mar. 27, 2002 (JP) ........................................ 2002-088504

(51) Int. Cl.⁷ .............................................. F16C 33/16
(52) U.S. Cl. .................................... 384/297; 384/907.1
(58) Field of Search ................................ 384/297, 298, 384/276, 907.1, 912

(56) References Cited

U.S. PATENT DOCUMENTS 5,993,733 A   11/1999   Kawai 6,056,443 A * 5/2000 Koike et al. ................ 384/296

FOREIGN PATENT DOCUMENTS

| DE | 31 13 004 A1 | 10/1982 |
| JP | A-2001-192754 | 7/2001 |

* cited by examiner

Primary Examiner—Lenard A. Footland
(74) Attorney, Agent, or Firm—Denso Corporation

(57) ABSTRACT

A bearing for a fuel pump includes a sliding layer made of mainly carbon, and a supporting layer made of mainly carbon and a metal. The supporting layer is connected to the sliding layer to support the sliding layer. Because the sliding layer of the bearing is made of mainly carbon, corrosion resistance of the bearing can be improved. Further, the supporting layer improves the strength of the bearing. Accordingly, the bearing with the two-layer structure effectively improves the corrosion resistance while the strength thereof can be increased. The bearing can be suitably used for the fuel pump. In this case, the bearing is press-fitted to a casing member on the supporting layer, and a rotary shaft of the fuel pump is slidably held in the bearing on the sliding layer.

7 Claims, 4 Drawing Sheets

BEARING FOR FUEL PUMP, METHOD OF MANUFACTURING THE SAME, AND FUEL PUMP

CROSS REFERENCE TO RELATED APPLICATION

This application is based on Japanese Patent Application No. 2002-88504 filed on Mar. 27, 2002, the disclosure of which is incorporated herein by reference.

BACKGROUND OF THE INVENTION

1. Field of the Invention

The present invention relates to a bearing for a fuel pump, which has a multi-layer structure, a method of manufacturing the same, and a fuel pump using the bearing.

2. Related Art

An engine of a vehicle has a low-pressure fuel pump that pressure-feeds a fuel from a fuel tank, to a delivery pipe of a fuel injection valve and a high-pressure pump. The fuel pump, not limited to an in-tank type, sucks fuel to the inside and discharges the fuel to a fuel line or the like. Consequently, the internal components are requested to have corrosion resistance to the fuel (resistance to fuel). Particularly, a bearing for movably supporting the rotary shaft of an armature which rotates at high speed in the fuel pump is demanded very much to have corrosion resistance from the viewpoint of assuring stable rotation of the armature. A conventional bearing is therefore made of a copper-based or brass-based sintered member. Further, a Cu—Zn—Ni—P—C graphite-dispersed Cu-based sintered alloy is disclosed in Japanese Patent Laid-open No. 2001-192754, for example.

Recently, however, a fuel containing a component different from conventional components, such as alcohol fuel is used. Because of global motorization, fuel refined in each country is used for a vehicle and the fuel often contains much oxide, sulfur, and the like. As a result, the corrosion resistance of the conventional bearings is not always sufficient. More particular, it is requested to assure a little clearance between the rotary shaft and the bearing. When corrosion occurs even a little on a sliding layer side on which the rotary shaft slides, it becomes difficult for the rotary shaft to rotate stably. Further, when the corrosion develops, it may cause a lock state of the fuel pump.

There is a method of making the whole bearing of chemically stable carbon (graphite). However, when the whole bearing is made of carbon, a crack or the like easily occurs. Since a method of processing the bearing is limited, the cost increases for assuring dimensional precision.

SUMMARY OF THE INVENTION

In view of the above-described problems, it is an object of the present invention to provide a bearing with a stable sliding characteristic by improving corrosion resistance at least on a sliding side on which a rotary shaft slides while suppressing deterioration in strength.

It is another object of the present invention to provide a fuel pump using the bearing, which can be manufactured in low cost while improving corrosion resistance.

It is a further another object of the present invention to provide a method of manufacturing the bearing.

According to the present invention, a bearing for a fuel pump is constructed of a sliding layer made of mainly carbon, and a supporting layer made of mainly carbon and a metal. The supporting layer is connected to the sliding layer to support the sliding layer. Because the sliding layer is made of carbon (graphite) which has an excellent sliding characteristic and moreover is chemically stable, stable corrosion resistance is obtained regardless of the composition of a fuel. Consequently, occurrence of a lock or the like is prevented between a rotary shaft and the bearing for movably supporting the rotary shaft, so that an excellent sliding characteristic can be obtained. On the other hand, the sliding layer which is relatively weak is supported by the supporting layer (metal-carbon layer) made of the metal and carbon mixture having excellent strength, the strength of the bearing can be sufficiently increased. Further, the supporting layer is made of the mixture of the carbon and the metal, in order to firmly connect the sliding layer and the supporting layer via binding of the carbons.

The bearing can be suitably used for a fuel pump. In this case, a motor of an armature is pivotally supported by the bearing on the sliding layer, and the bearing is pressure-fitted in a casing member of a pump member on the supporting layer. Accordingly, the advantage of the bearing can be sufficiently obtained in the fuel pump.

According to the present invention, a method of manufacturing the bearing includes: a first filling step of filling a first molding die having an annular-shaped first cavity with a mixed powder obtained by mixing a metal powder and a carbon powder; a first molding step of pressure-molding the mixed powder after the first filling step, thereby forming an annular-shaped first powder molding; a second filling step of filling a second molding die having an annular-shaped second cavity formed on an inner peripheral side or an outer peripheral side of the first powder molding placed in the second molding die; a second molding step of pressure-molding the carbon powder after the second filling step together with the first powder molding, thereby obtaining a second powder molding having an annular-shaped multi-layer structure; a sintering step of sintering the second powder molding by heating; and a shaping step of performing a shaping process on a sintered body, thereby forming the bearing having a predetermined shape. Accordingly, the bearing having the above-described advantage can be simply manufactured in low cost.

BRIEF DESCRIPTION OF THE DRAWINGS

Other objects, features and advantages of the present invention will become more apparent from the following detailed description made with reference to the accompanying drawings, in which.

DETAILED DESCRIPTION OF PREFERRED EMBODIMENT

Referring the drawings, a preferred embodiment of the present invention will be described. In this embodiment, the present invention is typically applied to a bearing for a fuel pump.

Figure 1:
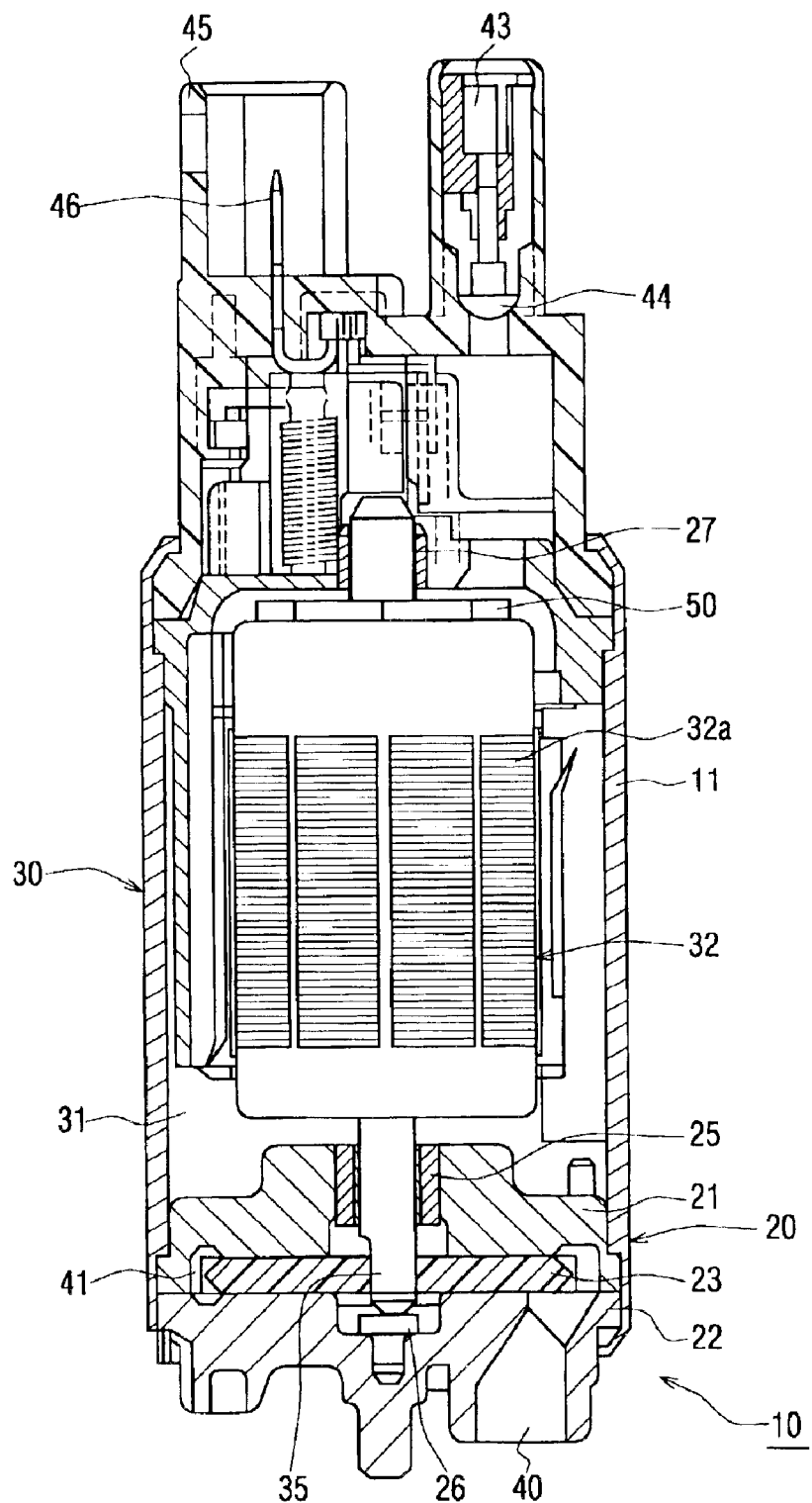
FIG. 1 is a vertical sectional view showing a fuel pump according to an embodiment of the present invention.

FIG. 1 shows a fuel pump 10 according to an embodiment of the present invention. The fuel pump 10 is mainly constructed with a pump 20 and a motor 30 used as a driving source of the pump 20.

First, the motor 30 will be now described. The motor 30 is a direct current motor with a brush. The motor 30 includes a permanent magnet annually disposed in a cylindrical housing 11 and an armature 32 disposed concentrically on the inner periphery side. A coil is disposed in the armature 32 and an end surface of a core 32a is exposed on the surface of the armature 32. A disc-shaped commutator 50 is disposed on the armature 32. From a terminal 46 buried in a connector 45, a direct current is supplied to the coil in the armature 32 via the brush (not shown) and the commutator 50.

The pump 20 is constructed mainly by a casing body 21, a casing cover 22, and an impeller 23. A casing member is constructed by the casing body 21 and the casing cover 22, and the impeller 23 is rotatably housed in the casing member. The impeller 23 is coupled to a rotary shaft 35 of the armature 32, so that the impeller 23 and the rotary shaft 35 rotate integrally.

The lower portion (in the diagram) of the rotary shaft 35 is rotatably supported by an annular bearing 25 that is press-fitted in the center of the casing body 21. The lower end of the rotary shaft 35 is removably supported by a thrust bearing 26 that is press-fitted and fixed in the center of the casing cover 22. Further, the upper portion of the rotary shaft 35 is removably supported by a bearing 27. Consequently, the armature 32 rotates smoothly.

When the armature 32 rotates, the impeller 23 provided with vanes in its peripheral portion also rotates, so that fuel is sucked from a fuel suction opening 40 and is press-sent to a fuel chamber 31 via a pump channel 41. The fuel which is press-sent to the fuel chamber 31 passes through around the armature 32 and is discharged from a fuel discharge port 43 to a fuel line. Since the fuel discharge port 43 is provided with a check valve member 44, leakage of the fuel in the fuel line is prevented.

Next, the structure of the bearing 25 will be described with reference to FIG. 2. The bearing 25 has a two-layer structure of a supporting layer 25a on the outer peripheral side and a sliding layer 25b on the inner peripheral side. The supporting layer 25a is obtained by sintering of a mixed powder that is mixture between a metal powder and a carbon powder. Peripheral surfaces of the supporting layer 25a at both ends are chamfered so as to facilitate press-fitting to the casing body 21. The sliding layer 25b is obtained by sintering the carbon powder and the inner peripheral surfaces at both ends are chamfered so that the rotary shaft 35 is easily fitted. In the embodiment, the thickness ($t_o$) of the whole bearing 25 is set to 0.8 mm and the thickness (t) of the sliding layer 25b is set to 0.1 mm. Here, the thickness of the supporting layer 25a is the rest of the thickness.

Figure 3:
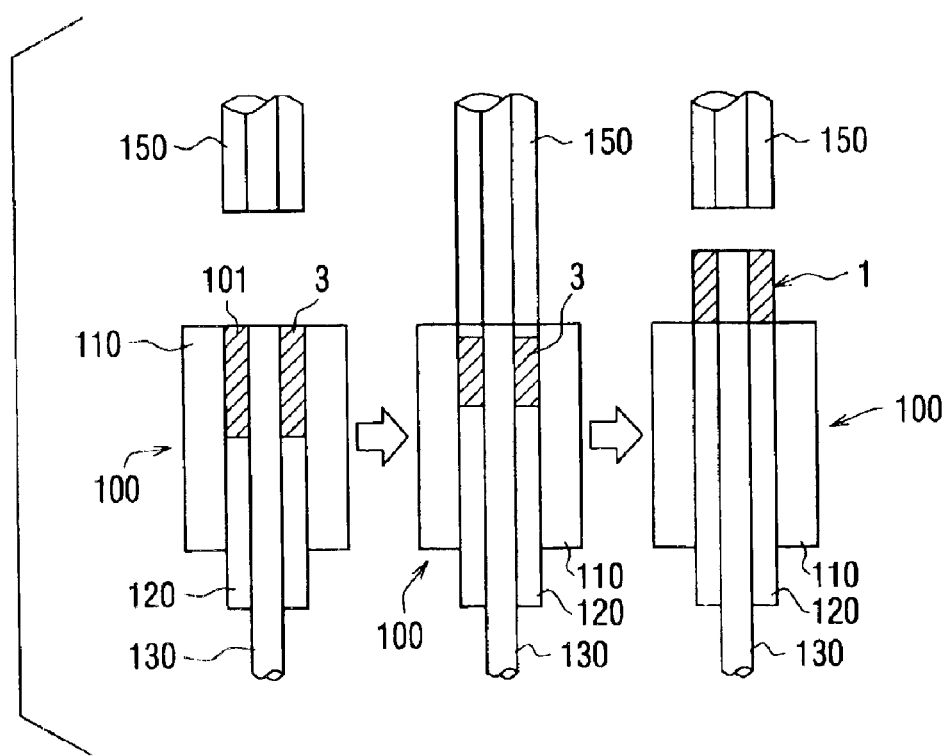
FIG. 3 is a schematic diagram showing a process of manufacturing a first powder molding of the bearing.
Figure 4:
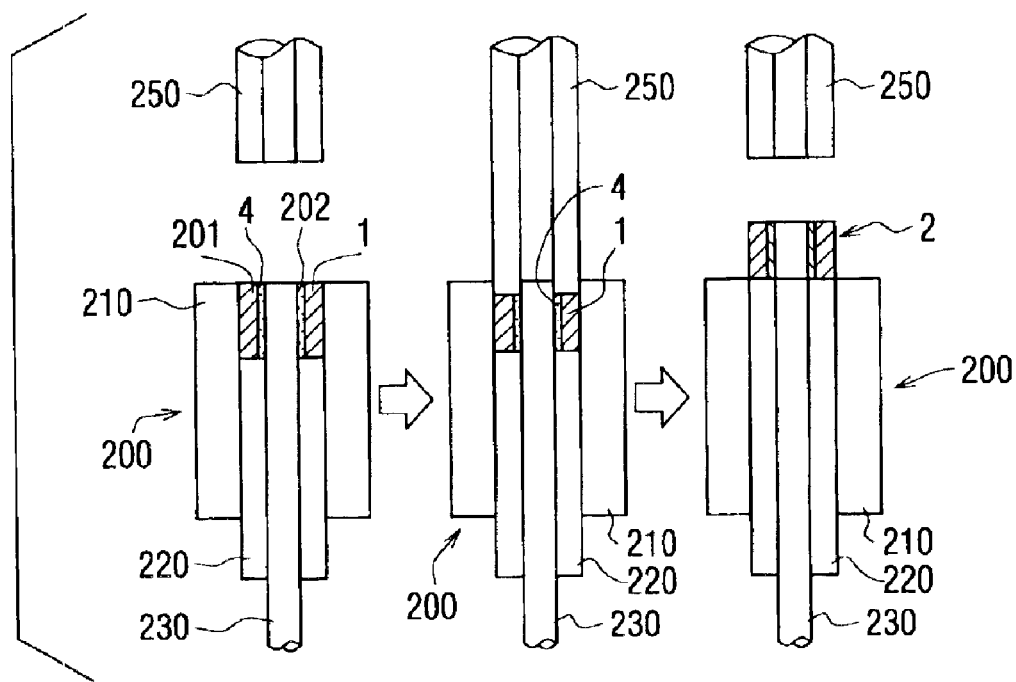
FIG. 4 is a schematic diagram showing a process of manufacturing a second powder molding of the bearing.
Figure 5:
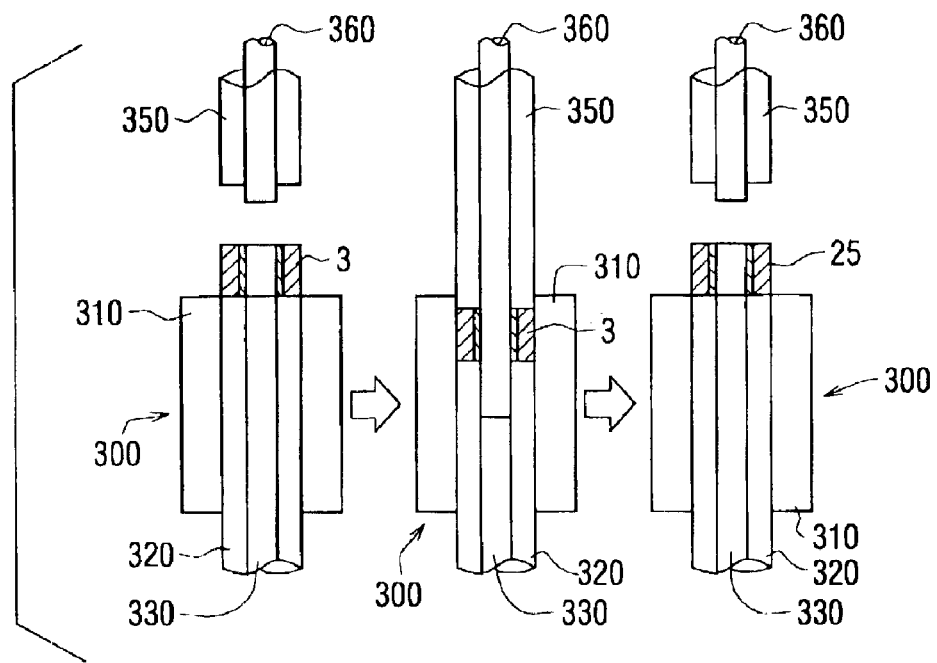
FIG. 5 is a schematic diagram showing a process of shaping the bearing.

A method of manufacturing the bearing 25 will now be described by referring to FIGS. 3 to 5. First, the process of manufacturing a first powder molding 1 made of the mixed powder 3 of the carbon powder and the metal powder will be described with reference to FIG. 3.

The mixed powder 3 is obtained by mixing the carbon powder and a brass (Cu—30% Zn) powder at a predetermined ratio in a ball mill. A first molding die 100 for defining a first cavity 101 having a circular shape with a bottom surface is filled with the mixed powder 3. The first molding die 100 includes a die 110 having a cylindrical shape, a lower punch 120 having a cylindrical shape which is fitted into the die 110 from below, a pin 130 as a core which is fitted to the center of the lower punch 120, and an upper punch 150. The pin 130 can be fitted into the center of the upper punch 150. The mixed powder 3 filled in the first cavity 101 is pressurized by the upper punch 150 and the lower punch 120 in a state where the pin 130 is fitted in the center. After that, the lower punch 120 is pushed up, thereby obtaining the annular-shaped first powder molding 1.

Next, a process of manufacturing a second powder molding 2 will be described with reference to FIG. 4. The first powder molding 1 is placed on a circular-shaped cavity 201 with a bottom surface. A second molding die 200 for forming the cavity 201 includes a die 210 having a cylindrical shape, a lower punch 220 having a cylindrical shape which is fitted in the die 210 from below, a pin 230 as a core which is fitted to the center of the lower punch 220, and an upper punch 250. The pin 230 can be fitted into the center of the upper punch 250. The die 210 has the same shape as that of the die 110 but the pin 230 is narrower than the pin 130. Accordingly, the inner diameters of the lower punch 220 and the upper punch 250 are smaller than those of the lower punch 120 and the upper punch 150, respectively.

When the first powder molding 1 is placed in the cavity 201, an annular-shaped cavity 202 is formed between the inner surface of the first powder molding 1 and the outer surface of the pin 230. Then, the cavity 202 is filled with the carbon powder 4. In such a state, the first powder molding 1 and the carbon powder 4 are pressure-molded by the lower punch 220 and the upper punch 250. After that, when the lower punch 220 is pushed up, the second powder molding 2 in which the carbon powder 4 is pressure-molded on the inner circumferential surface of the first powder molding 1 is obtained.

The obtained second powder molding 2 is sintered at 900° C. for eight hours, thereby obtaining a sintered body 3.

A process of shaping the inner and outer peripheral surfaces of the sintered body 3 will now be described by referring to FIG. 5. The sintered body 3 is placed on a shaping mold 300. The shaping mold 300 includes a die 310 having a cylindrical shape, a lower punch 320 having a cylindrical shape which is fitted in the die 310 from below, a pin 330 as a core which is fitted into the center of the lower punch 320, and an upper punch 350. A pin 360 having the same diameter as that of the pin 330 is fit into the center of the upper punch 350.

The sintered body 3 is positioned by the pins 330 and 360 and the sintered body 3 is pressed downward by the upper punch 350, thereby shaping the sintered body 3. At this time, the outer peripheral surface of the sintered body 3 is shaped by the inner peripheral surface of the die 310, and the inner peripheral surface of the sintered body 3 is shaped by the outer peripheral surface of the pin 360. When the lower punch 320 is pushed up, the bearing 25 having the inner and outer diameters corrected to predetermined dimensions is obtained. By chamfering the outer and inner peripheral ends, the bearing 25 shown in FIG. 2 is obtained.

Although the bearing 25 has been mainly described in the embodiment, each of the bearing 27 and the thrust bearing 26 can also have a two-layered structure with a sliding layer and a supporting layer.

According to the embodiment of the present invention, the strength of the bearing 25, 26, 27 for a fuel pump can be increased, and corrosion resistance of the sliding surface of the bearing 25, 26, 27 can be effectively improved while the bearing 25, 26, 27 is manufactured in low cost.

According to the present invention, the sliding layer 25b is made of carbon (graphite) which has an excellent sliding characteristic and moreover is chemically stable, so that stable corrosion resistance is obtained regardless of the composition of a fuel. Consequently, occurrence of a lock or the like is prevented between the rotary shaft 35 and the bearing 25, 26, 27 for movably supporting the rotary shaft 35, so that an excellent sliding characteristic can be obtained.

Because the sliding layer (carbon layer) 25b which is relatively weak is supported by the supporting layer 25a (metal-carbon layer) made of a metal and carbon mixture having excellent strength, the strength of the bearing 25 of the present invention can be sufficiently increased.

In the present invention, the supporting layer 25a is made of the mixture of the carbon and the metal, in order to firmly connect the sliding layer 25b and the supporting layer 25a via binding of the carbons.

Figure 6:
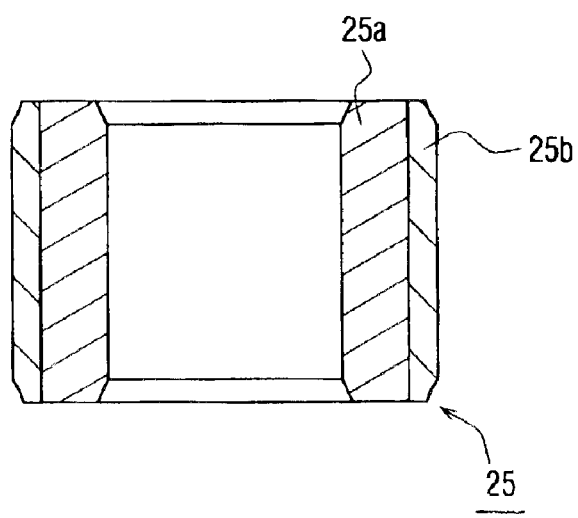
FIG. 6 is a schematic sectional view showing another bearing according to the embodiment.

In the bearing 25, usually, the sliding layer 25b is provided on the inner peripheral side and the supporting layer 25a is provided on the outer peripheral side. However, in the present invention, the sliding layer 25b can be provided on the outer peripheral side and the supporting layer 25a may be provided on the inner peripheral side, as shown in FIG. 6. In this case, the bearing 25 is press-fitted in a rotary shaft and the outer peripheral surface of the bearing can be used as the sliding surface.

In the present invention, the composition of the supporting layer 25b has the corrosion resistance necessary in a fuel and is constructed to be strongly connected to the sliding layer 25b. Consequently, it is preferable that the supporting layer 25a has the following composition. When the whole supporting layer 25a is 100 mass %, preferably, the supporting layer 25a is made of 20 to 30 mass % of carbon (C), 18 to 26 mass % of Zn, and the rest of Cu and an unavoidable impurity. Alternatively, when the whole supporting layer 25b is 100 mass %, the supporting layer 25b is made of 20 to 30 mass % of C, 9 to 16 mass % of Zn, 9 to 16 mass % of nickel (Ni), 0.1 to 0.7% of phosphorus (P), and the rest of Cu and an unavoidable impurity.

Zn and Ni are melted in Cu, thereby forming a base material having a solid solution phase of Cu—Zn or Cu—Zn—Ni alloy to increase the strength and corrosion resistance of the supporting layer 25a. When the amount of Zn is too small, the correction resistance is not improved. When the amount of Zn is too large, it is difficult to increase strength. When the amount of Ni is too small or too large, it is difficult to assure strength.

P is a component effective to improve the degree of sintering and to improve the strength of the supporting layer 25a. Particularly, since a hard Cu—P alloy which can be dispersed in the base material is formed, P has an effect of improving abrasion resistance of the supporting layer 25a. If the amount of P is too small, improvement in strength is not expected. If the amount of P is too large, deterioration in strength is caused.

C exists mainly as black lead which is dispersed in the base material. In the bearing of the invention, by containing C in the supporting layer 25a, the supporting layer 25a and the sliding layer 25b can be bonded to each other strongly.

Next, the composition of the sliding layer 25a will be now described. The main component of the sliding layer 25b is C. More concretely, the sliding layer 25b is made of graphite having excellent lubricity. As a result, the bearing 25 has a small coefficient of friction with the rotary shaft 35. Further, the bearing 25 has excellent sliding characteristic and abrasion resistance.

The sliding layer 25b of the present invention may contain a small amount of impurity (including unavoidable impurity). The impurity is, for example, a resin such as a binder, a metal dispersed from the supporting layer 25a in the sintering process, or the like.

Next, the thickness of the sliding layer 25b and the supporting layer 25a will be now described. The sliding layer 25b has, preferably, a predetermined thickness in consideration of an abrasion amount. On the other hand, in consideration of a crack, cost, and the like, the thickness is preferably within a predetermined range. According to studies by the inventor of the present invention, the thickness (t) of the sliding layer 25b is preferably in a range between 5% and 20% of total thickness ($t_o$) of the sliding layer 25b and the supporting layer 25a. More preferably, the thickness (t) of the sliding layer 25b is in a range between 7% and 15% of the total thickness ($t_o$) of the sliding layer 25b and the supporting layer 25a. Generally, a preferable thickness of the sliding layer 25b is in a range between 0.07 mm–0.15 mm. More preferably, the thickness of the sliding layer 25a is about in a range between 0.08 mm–0.12 mm.

When the sliding layer 25b is too thin, as abrasion progresses, the sliding layer 25b is substantially worn out. However, if the sliding layer 25b has a certain degree of thickness, there is no problem since bearing surface pressure is reduced as the abrasion progresses and the abrasion amount is saturated.

When the supporting layer 25a is too thin, the function of the supporting layer 25a is not achieved. If the supporting layer 25a is too thick, the size of the bearing 25 becomes large and it becomes difficult to press-fit the bearing 25 into a housing. The thickness of the supporting layer is, for example, preferably within a range where the supporting layer 25a functions as an elastic body when the bearing 25 is press-fit into the housing.

According to the manufacturing method of the present invention, the bearing 25 for a fuel pump is manufactured by filling a cavity of a molding die with powder materials having composition of each of the sliding layer 25b and the supporting layer 25a, press-molding the powder materials, sintering the molding and, after that, processing the sintered body in desired dimensions. As the powder carbon, commercially-available powder graphite can be used. A binder or the like may be properly mixed in the powder carbon. As the metal powder, any of various kinds of alloy powders, a plain powder, an atomized powder, or the like can be used. It is preferable to use any of the powders each having an average particle diameter about in a range between 10 and 100 $\mu$m.

It is sufficient to pressurize the filled powder at about 250 to 450 MPa. When the first molding die 100 used in the first filling process and the first molding process and the second molding die 200 used in the second filling process and the second molding process are prepared to be different from each other, the workability (mass production) is improved.

Although it depends on the material of the powders, the sintering temperature is set in a temperature range in which carbon is sintered and the metal does not melt. Generally, the temperature is preferably in a range about between 700–900° C. The sintering atmosphere is preferably, vacuum, inactive gas, nitrogen gas atmosphere, or the like.

By performing the shaping process of the sintered body obtained in the sintering process, the sliding layer 25b and the supporting layer 25a of the bearing 25 are finished with predetermined dimensions and surface roughness. The supporting layer 25a is shaped by, for example, sizing. The sliding layer 25a is processed by, for example, shaving.

It is preferable to adjust dimension of a die for molding and a filling amount of the material powders in consideration of heat contraction or the like in the sintering step. Although it is sufficient that the sliding layer 25b has a composition which is generally uniform, the composition of the mixed powder may be also sequentially changed so as to have a gradient function.

Although the present invention has been fully described in connection with the preferred embodiment thereof with reference to the accompanying drawings, it is to be noted that various changes and modifications will become apparent to those skilled in the art.

Figure 2:
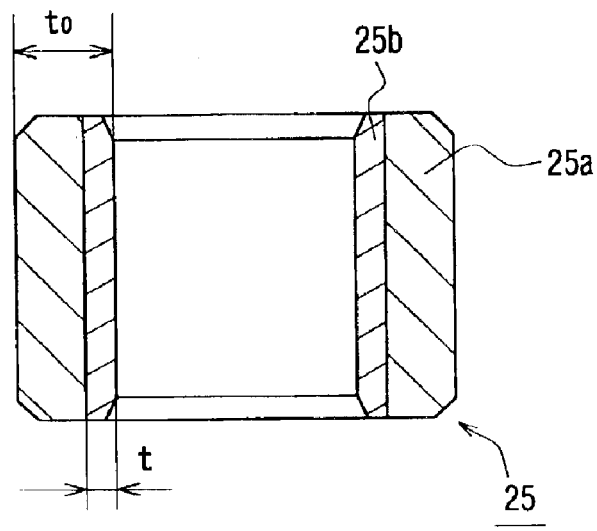
FIG. 2 is an enlarged cross-sectional view of a bearing used for the fuel pump.

For example, the supporting layer 25a and the sliding layer 25b of the bearing 25 can be changed to the other shapes except for the shapes of FIGS. 2 and 6. Further, in the fuel pump 10, each of the bearings 26 and 27 can be formed to have a structure similar to that of the bearing 25.

Such changes and modifications are to be understood as being within the scope of the present invention as defined by the appended claims.

What is claimed is:

1. A bearing for a fuel pump, comprising:
   a sliding layer made of mainly carbon; and
   a supporting layer made of mainly carbon and a metal, the supporting layer being connected to the sliding layer to support the sliding layer.

2. The bearing for a fuel pump according to claim 1, wherein a thickness (t) of the sliding layer is 5 to 20% of a total thickness ($t_o$) of the sliding layer and the supporting layer.

3. The bearing for a fuel pump according to claim 1, wherein the thickness (t) of the sliding layer is 7 to 15% of the total thickness ($t_o$) of the sliding layer and the supporting layer.

4. The bearing for a fuel pump according to claim 1, wherein,
   when the whole supporting layer is 100 mass %, the supporting layer is made of 20 to 30 mass % of carbon (C), 18 to 26 mass % of zinc (Zn), and the rest of copper (Cu) and an unavoidable impurity.

5. The bearing for a fuel pump according to claim 1, wherein,
   when the whole supporting layer is 100 mass %, the supporting layer is made of 20 to 30 mass % of carbon (C), 9 to 16 mass % of Zinc (Zn), 9 to 16 mass % of nickel (Ni), 0.1 to 0.7% of phosphorus (P), and the rest of copper (Cu) and an unavoidable impurity.

6. The bearing for a fuel pump according to claim 1, wherein:
   the supporting layer substantially has a cylindrical shape with inner and outer peripheral surfaces; and
   the sliding layer is provided on the inner peripheral surface of the supporting layer.

7. The bearing for a fuel pump according to claim 1, wherein:
   the supporting layer substantially has a cylindrical shape with inner and outer peripheral surfaces; and
   the sliding layer is provided on the outer peripheral surface of the supporting layer.

* * * * *